United States Patent
Do et al.

(10) Patent No.: US 8,180,011 B2
(45) Date of Patent: *May 15, 2012

(54) CLOCK AND DATA RECOVERY LOOP WITH ISI PATTERN-WEIGHTED EARLY-LATE PHASE DETECTION

(75) Inventors: Viet Linh Do, Carlsbad, CA (US); Wei Fu, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 381 days.

This patent is subject to a terminal disclaimer.

(21) Appl. No.: 12/507,034

(22) Filed: Jul. 21, 2009

(65) Prior Publication Data

US 2009/0279653 A1 Nov. 12, 2009

Related U.S. Application Data

(63) Continuation-in-part of application No. 12/399,861, filed on Mar. 6, 2009, which is a continuation-in-part of application No. 11/954,325, filed on Dec. 12, 2007.

(51) Int. Cl.
*H04L 7/00* (2006.01)
*H04L 25/00* (2006.01)
*H04L 25/40* (2006.01)

(52) U.S. Cl. ........................ 375/371; 375/348

(58) Field of Classification Search .................. 375/354, 375/355, 371, 373, 375, 376, 348
See application file for complete search history.

(56) References Cited

U.S. PATENT DOCUMENTS

| | | | |
|---|---|---|---|
| 5,115,454 A * | 5/1992 | Kucar | 375/321 |
| 5,875,218 A * | 2/1999 | Barham et al. | 375/376 |
| 7,945,805 B2 * | 5/2011 | Baumgartner et al. | 713/501 |
| 2003/0123594 A1 * | 7/2003 | Glenn et al. | 375/373 |
| 2008/0112521 A1 * | 5/2008 | Schmatz et al. | 375/355 |

* cited by examiner

*Primary Examiner* — Chieh M. Fan
*Assistant Examiner* — Freshteh N Aghdam
(74) *Attorney, Agent, or Firm* — Law Office of Gerald Maliszewski; Gerald Maliszewski (57) ABSTRACT

An inter-symbol interference (ISI) pattern-weighted early-late phase detector is provided. I and Q clocks are generated, where the Q clock has a fixed phase delay with respect to the I clock. The I clock frequency is divided by n, creating a reference clock. A serial data stream is sequentially sampled with the I and Q clocks, creating digital I-bit and Q-bit values, respectively. The I-bit values and Q-bit values are segmented into n-bit digital words. In response to analyzing the I-bit and Q-bit values, I clock phase corrections are identified. Also identified are bit sequence patterns associated with each I-bit value. Each I-bit value is weighted in response to the identified bit sequence pattern and the identified I clock phase correction. A phase error signal is generated by averaging the weighted I-bit values for each n-bit digital word, and I clock is modified in phase.

20 Claims, 8 Drawing Sheets

CLOCK AND DATA RECOVERY LOOP WITH ISI PATTERN-WEIGHTED EARLY-LATE PHASE DETECTION

RELATED APPLICATIONS

This application is a continuation-in-part of a pending application entitled, SINGLE CLOCK CYCLE FIRST ORDER LIMITED ACCUMULATOR FOR SUPPLYING WEIGHTED CORRECTIONS, invented by Do et al., Ser. No. 12/399,861, filed Mar. 6, 2009;

which is a continuation-in-part of a pending application entitled, FLEXIBLE ACCUMULATOR FOR RATIONAL DIVISION, invented by Do et al., Ser. No. 11/954,325, filed Dec. 12, 2007. These applications are incorporated herein by reference.

BACKGROUND OF THE INVENTION

1. Field of the Invention

This invention generally relates to signal phase detection and tracking and, more particularly, to a system and method to optimize an early/late phase detector using pattern weighting.

2. Description of the Related Art

Figure 1:
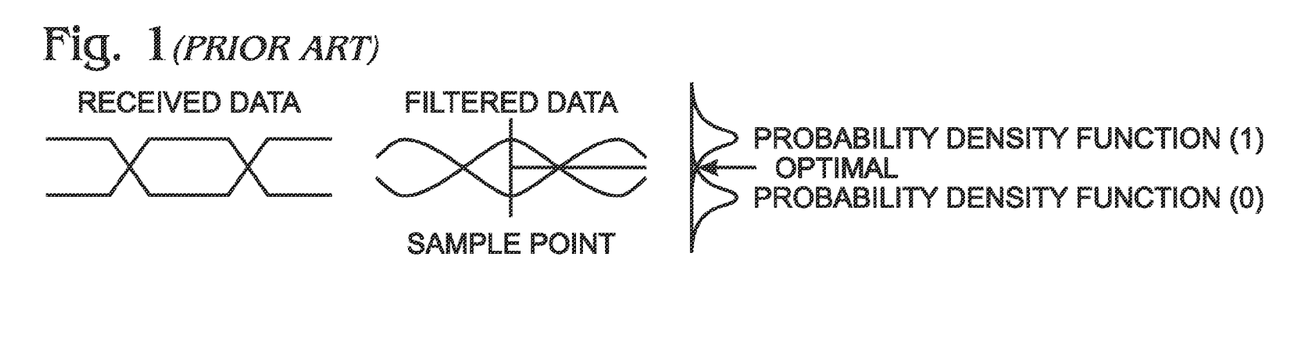
FIG. 1 is a diagram illustrating a signal recovered from a binary symmetric, non-dispersive channel in the presence of noise (prior art).

FIG. 1 is a diagram illustrating a signal recovered from a binary symmetric, non-dispersive channel in the presence of noise (prior art). Conventionally, the signal is filtered with a transfer function matched to the signaling waveform (in this case a one unit step) and thresholded at the voltage level most likely to yield the transmitted bit. To recover the transmitted information, a hard decision must be made on the value of the received bit.

As a function of the filtering process, and sometimes as a result of the transmission process, pulse spreading occurs. That is, the energy associated with a bit spreads to neighboring bits. For small degrees of spreading these effects of this can be limited to the nearest neighbors with modest degradation in performance.

Three basic types of pulse spreading exist. The first possibility is that both the neighboring bits are a zero (no neighboring bits are a one). The second possibility is that only one of the neighboring bits (either the preceding or subsequent bit) is a one. Alternately stated, only one of the neighboring bits is a zero. The third possibility is that both neighboring bits are one.

Figure 2:
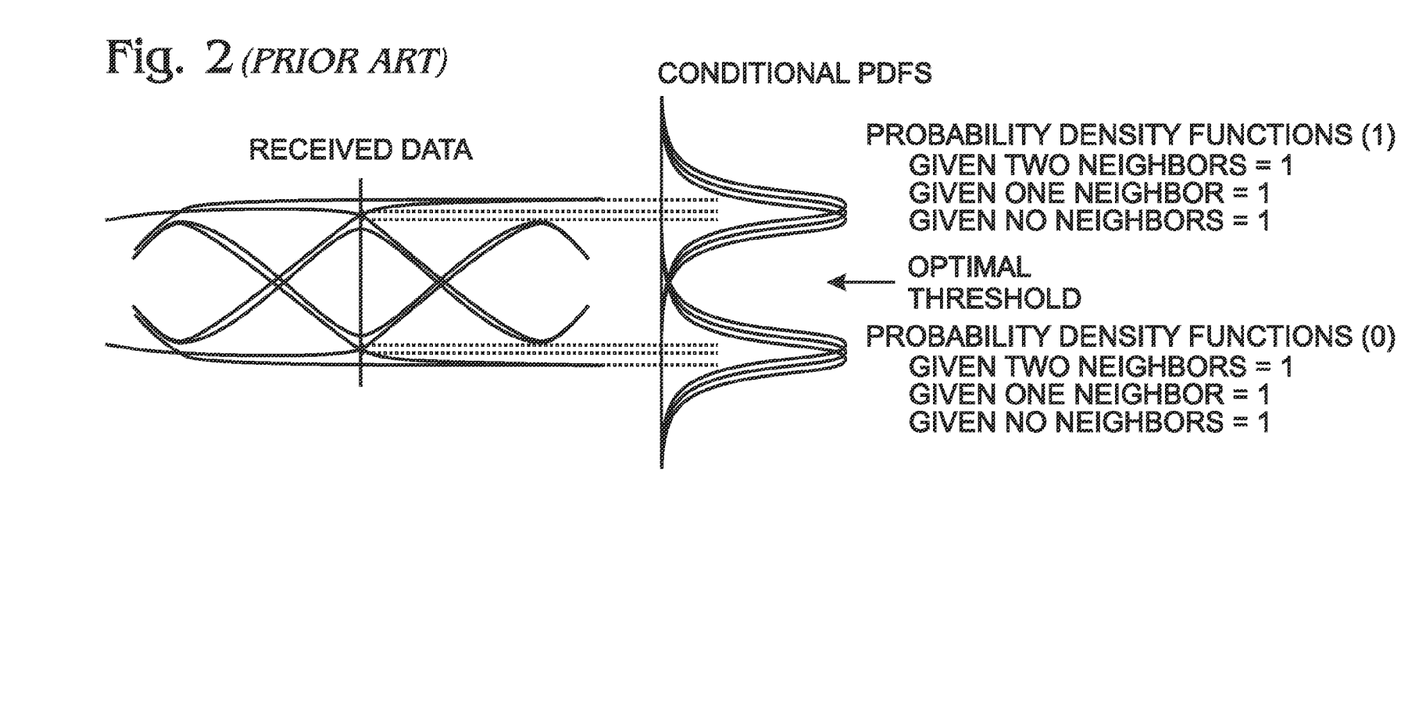
FIG. 2 is a diagram illustrating received waveforms that are distorted in response to the inter-symbol interference resulting from energy dispersion (prior art).

FIG. 2 is a diagram illustrating received waveforms that are distorted in response to the inter-symbol interference resulting from energy dispersion (prior art). The value at the output of the filter varies with each bit, and is essentially a random process, due to the non-deterministic nature of the information, and scrambling that is often used in the transmission of data streams. However, received bits can be characterized with probability density functions (PDFs), as shown. Without knowledge of the neighboring bits, a single probability density function could be extracted that represents the random behavior of the input over all conditions and all sequences. However, conditional probability density functions can be defined for the three cases mentioned above. Namely, probability density functions can be defined for the cases where there are zero neighboring ones, only one neighboring one, and two neighboring ones.

The degree of dispersion exhibited by a channel, and hence the separation of the conditional probability density functions, varies in response to a number of fixed and variable factors. Effective dispersion mitigation techniques must therefore be optimized to the channel and somewhat adaptive to changes in the channel due to aging, temperature changes, reconfiguration, and other possible influences.

The above-mentioned problems are compounded if the receiver must recover the clock from the incoming data stream. That is, ISI on the received data may cause the phase detector to adjust the phase in the wrong direction if all possible ISI patterns are treated equally. Clock jitter results from the inability of a phase detector to properly lock or track phase, which becomes another source of increased bit error rate (BER).

If the bit value decision process could be made using the knowledge of the decision made on the preceding decoded bit, or with a measurement of preceding and subsequent decoded bits, then the corresponding probability density function could be selected to make a more accurate decision on the current bit decision. Such a process would require that the bits be converted from analog to digital information. However, it is not practical to perform an analog-to-digital (A/D) conversion at high serial stream data rates.

Further, there is a latency associated with processing of digital signals. Since the latency of a digital phase detector and the feedback loop used in a clock and data recovery (CDR) device determines the performance of CDR locking, tracking, and jitter, the feedback design must keep the latency as low as possible. The inherent latency of conventional digital circuitry limits the use of purely digital oscillator circuitry to relatively low frequencies.

It would be advantageous if phase detector signal tracking could be improved using ISI pattern weighting. It would be advantageous if phase detector and pattern weighting process could be performed in the digital domain to save power.

SUMMARY OF THE INVENTION

Disclosed herein is a phase detector that weights data sequence patterns to mitigate against the effects of inter-symbol interference (ISI) in received data. Multiple data patterns or sequences are detected and assigned different ISI weights, which are used by the phase detector to adjust the recovered clock phase. ISI patterns that have a lower probability of being correct are assigned with less weight, and vice versa.

Accordingly, a method is provided for acquisition and tracking of a recovered clock signal using an inter-symbol interference (ISI) pattern-weighted early-late phase detector. An electromagnetic waveform is received representing an analog serial data stream. I and Q clocks are generated, where the Q clock has a fixed phase delay with respect to the I clock. The I clock frequency is divided by n, creating a reference clock. The serial data stream is sequentially sampled with the I clock, creating digital I-bit values. Likewise, the serial data stream is sequentially sampled with a Q clock, creating digital Q-bit values. The I-bit values are segmented into n-bit digital words. Likewise, the Q-bit values are segmented into n-bit digital words. In response to analyzing the I-bit and Q-bit values, I clock phase corrections are identified. Also identified are bit sequence patterns associated with each I-bit value. Each I-bit value is weighted in response to the identified bit sequence pattern and the identified I clock phase correction. A digital phase error signal is generated by averaging the weighted I-bit values for each n-bit digital word, creating an electromagnetic signal representing the I clock, modified in phase.

In one aspect, the weighting of each bit value in response to the identified bit sequence pattern includes identifying a response characteristic associated with a channel on which the analog serial input stream is received. Then, weight can be assigned in response to criteria such as the number of bits preceding a current bit value, the number of bits following the current bit value, a bit sequence length, or a combinations of the above-mentioned criteria.

Additional details of the above-described method and a clock and data recovery (CDR) device with a system for the acquisition and tracking of a clock signal using an ISI pattern-weighted early-late phase detector, are presented below.

DETAILED DESCRIPTION

Figure 3:
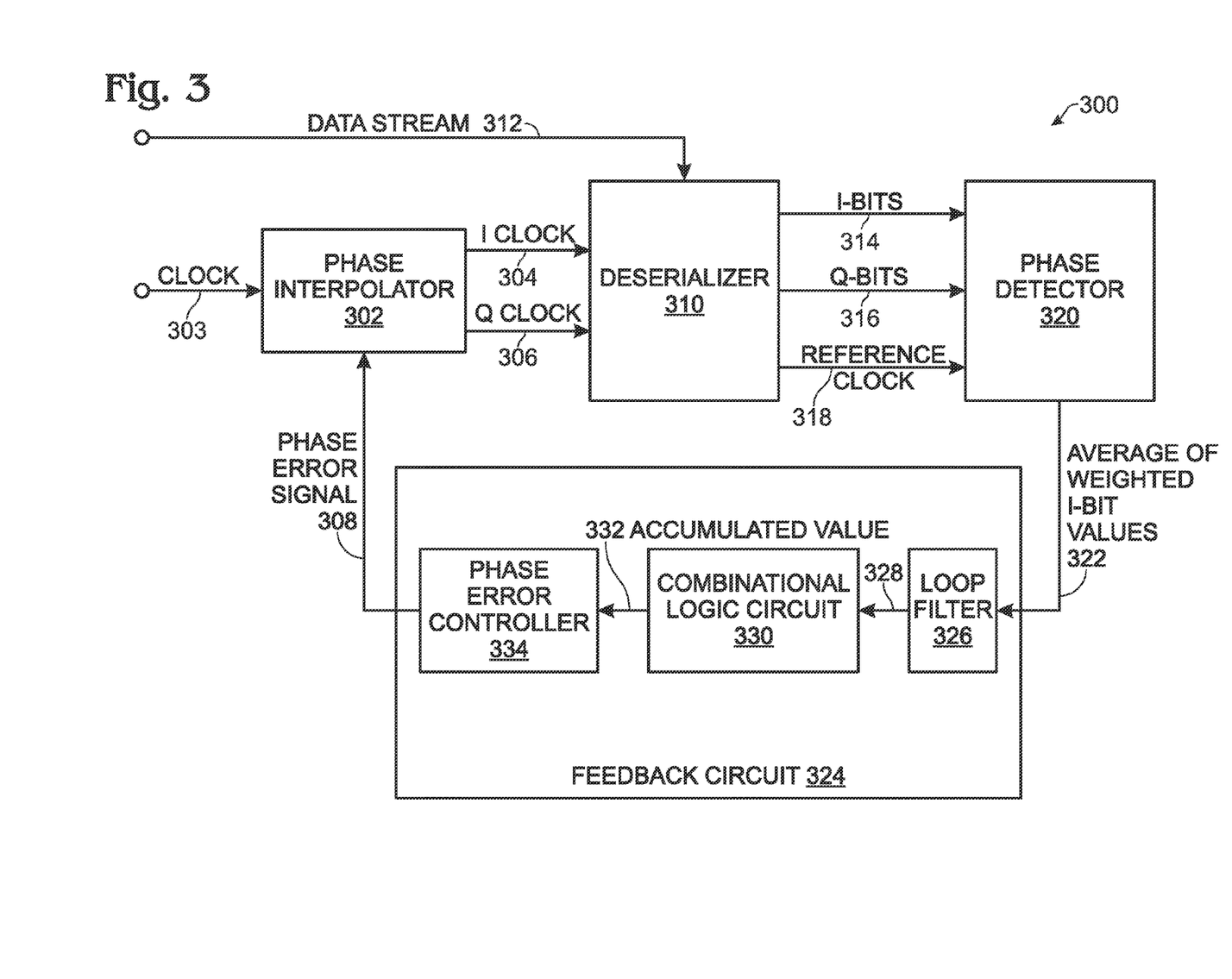
FIG. 3 is a schematic block diagram of a clock and data recovery (CDR) device with a system for the acquisition and tracking of a clock signal using an inter-symbol interference (ISI) pattern-weighted early-late phase detector.

FIG. 3 is a schematic block diagram of a clock and data recovery (CDR) device with a system for the guaranteed acquisition and tracking of a clock signal using an inter-symbol interference (ISI) pattern-weighted early-late phase detector. The system 300 comprises a phase interpolator 302 having an input on line 303 to accept a fixed frequency clock, an output on line 304 to supply an I clock signal, an output on line 306 to supply a Q clock signal having a fixed delay with respect to the I clock signal, and an input on line 308 to accept a digital phase error signal. The I clock has the same frequency as the clock on line 303, but the frequency of the I (and Q) clock varies in response to the phase error signal. In one aspect, the phase interpolator 302 generates a Q clock signal that is delayed 90 degrees in phase from the I clock signal. However, the system is not necessarily limited to this value. Neither is the system limited to the Q clock having a fixed phase relationship with the I clock.

A deserializer 310 has an input on line 312 to accept an analog serial data stream, an input on line 304 to accept the I clock, and an input on line 306 to accept the Q clock. The deserializer 310 has an output on line 314 to supply n-bit digital words of I-bit values generated by sampling the serial data stream with the I clock. The deserializer 310 has an output on line 316 to supply n-bit words of Q-bit values generated by sampling the serial data stream with the Q clock. The deserializer 310 also has an output on line 318 to supply a reference clock signal equal to the I clock frequency divided by n.

An early-late phase detector 320 has an input on line 314 to accept the I-bit values, an input on line 316 to accept the Q-bit values, and an input online 318 to supply the reference clock.

In response to analyzing the I-bit and Q-bit values, detector 320 identifies an I clock phase correction. The detector 320 also identifies bit sequence patterns associated with each I-bit value, and weights each I-bit value in response to the identified bit sequence pattern and the identified I clock phase correction. The detector 320 has an output on line 322 to supply a digital average of the weighted I-bit values for each n-bit digital word.

A feedback circuit 324 is connected between the phase detector 320 and the phase interpolator 302. The feedback circuit 324 includes a digital loop filter 326 with an input on line 322 to accept the average of the weighted I-bit values for each n-bit digital word, and an output on line 328 to supply a filtered value. The system 300 is enabled using a wide range of conventional loop filters. The system is not limited to any particular kind of loop filter design, although a design that minimizes latency is typically preferred. The loop filter 326 feeds combinational logic circuitry 330, which is capable of a first order accumulation of error in a single clock cycle. The accumulated value is supplied on line 332. Details of the combination logic circuit are provided in parent application Ser. No. 12/399,861, which is incorporated herein by reference. A phase error controller 334 accepts the accumulated value and supplies the phase error signal on line 308.

In one aspect, the phase interpolator 302 recognizes a normalized number associated with no change in the I clock phase, and changes the I clock phase by a magnitude responsive to the difference between the phase error signal and the normalized number.

The deserializer 310 accepts the analog serial data stream via a channel on line 312 that can be identified as having a response characteristic. The three typically response characteristics are known as pre-cursor, post cursor, and symmetrical. For example, telecom networks typically transmit relatively large amplitude signals that gradually decay as a function of channel length. Such a network is typically characterized as having a post-cursor response. Alternately, Internet networks may have a channel response that is characterized as symmetric.

The weighting of bit sequence patterns varies for different channel response characteristics. That is, the detector 320 assigns a weight to bit sequence patterns in response to an identified channel characteristic. In one aspect, the channel characteristics are preconfigured at initialization. The detector 320 applies weight to bit sequence patterns in response to criteria such as the number of bits preceding a current bit value, the number of bits following the current bit value, a bit sequence length, or combinations of the above-mentioned criteria.

Figure 4:
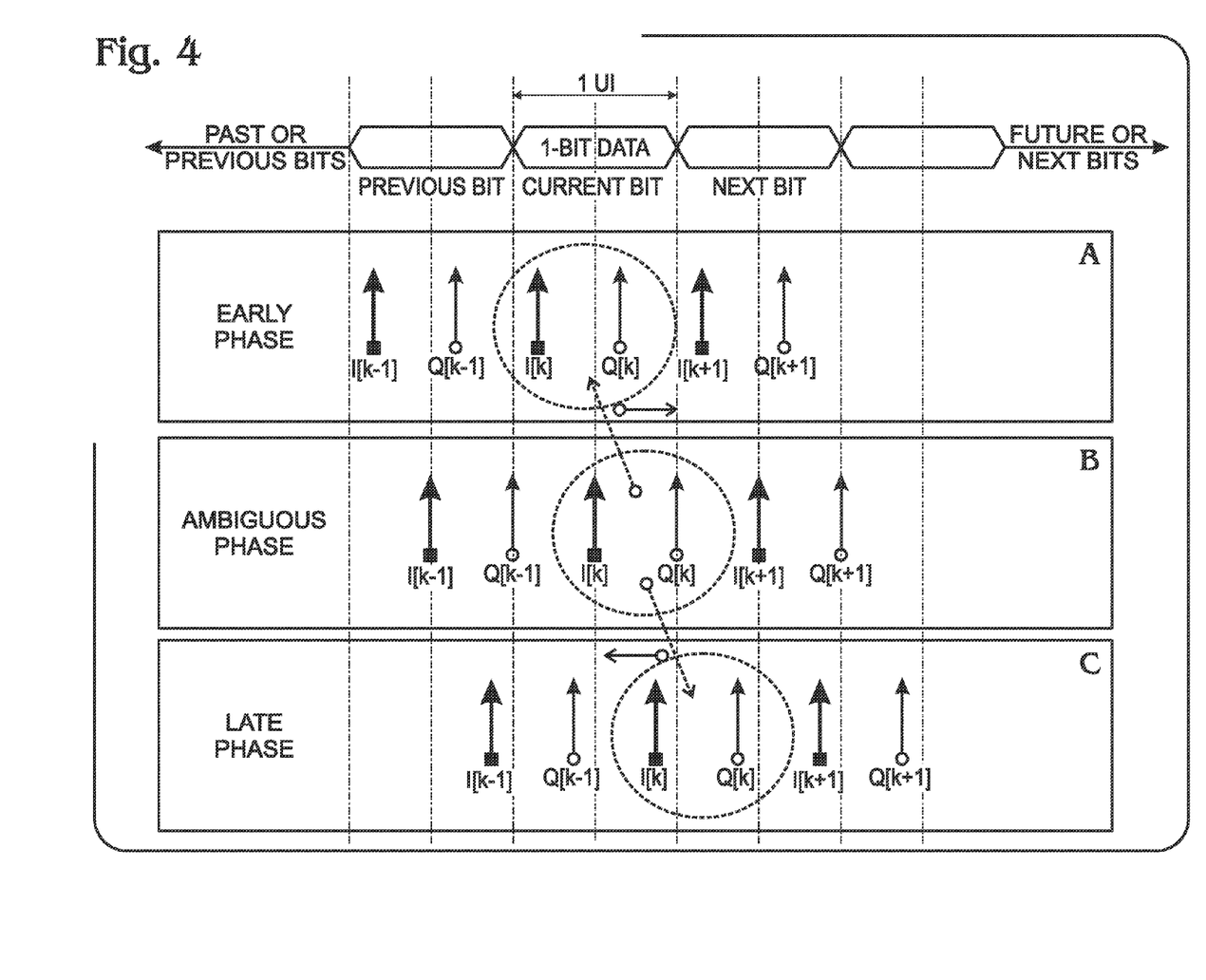
FIG. 4 is a diagram illustrating a process for identifying phase corrections.

FIG. 4 is a diagram illustrating a process for identifying phase corrections. The detector identifies one of three types of phase correction types: early phase, late phase, and ambiguous phase. The detector assigns a multiplication factor to each phase correction type, where the ambiguous phase has a multiplication factor of 0, the early phase has a first number multiplication factor with a first sign polarity (e.g. +1), and the late phase has the first number multiplication factor with a second sign polarity, opposite to the first sign polarity (e.g., −1).

As noted above, the detector applies a weight number to identified bit sequence patterns, where a higher weight number indicates a greater degree of confidence in the identified I-bit value. The detector multiplies the weight number by the identified phase correction multiplication factor.

In Section A the detector identifies an early phase correction since a previous I-bit value (DI(k−1)) equals a previous Q-bit value (DQ(k−1)), and the previous Q-bit value (DQ(k−1)) does not equal a current I-bit value (DI(k)).

In Section B the detector identifies an ambiguous phase correction since a previous I-bit value (DI(k−1)) equals a previous Q-bit value (DQ(k−1)), and the previous Q-bit value (DQ(k−1)) equals a current I-bit value (DI(k)). Although the previous Q-bit value (DQ(k−1)) is shown at the eye closure point, it is delayed just enough to be the same value as the (DI(k)) value. Alternately, an ambiguous phase is determined if the previous I-bit value (DI(k−1)) equals the current I-bit value (DQ(k)), and the current I-bit value (DI(k)) does not equal the previous Q-bit value (DQ(k−1)).

In Section C the detector identifies a late phase correction since a previous I-bit value (DI(k−1)) does not equal a previous Q-bit value (DQ(k−1)), and the previous Q-bit value (DQ(k−1)) equals a current I-bit value (DI(k)).

FUNCTIONAL DESCRIPTION

Figure 5:
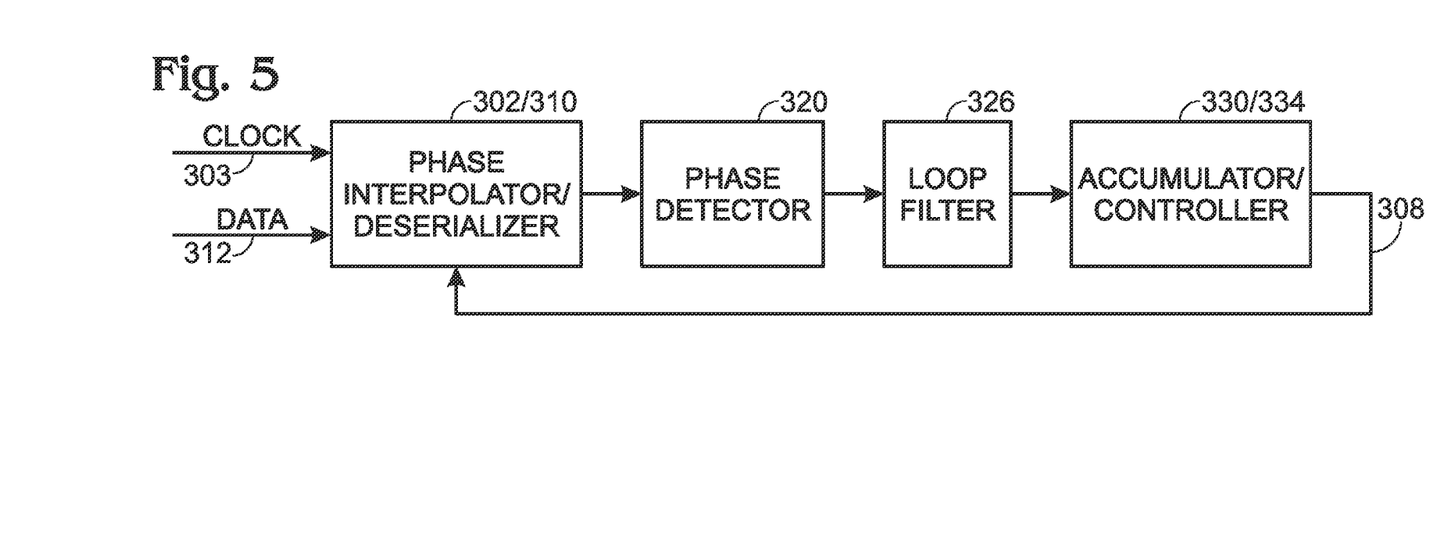
FIG. 5 is a schematic block diagram depicting a phase detector in a CDR system where an ISI pattern match is utilized.

FIG. 5 is a schematic block diagram depicting a phase detector in a CDR system where an ISI pattern match is utilized. Although an early/late phase detection algorithm is described in FIGS. 3 and 4, other phase detect algorithms also benefit from utilizing ISI pattern matching.

Figure 6:
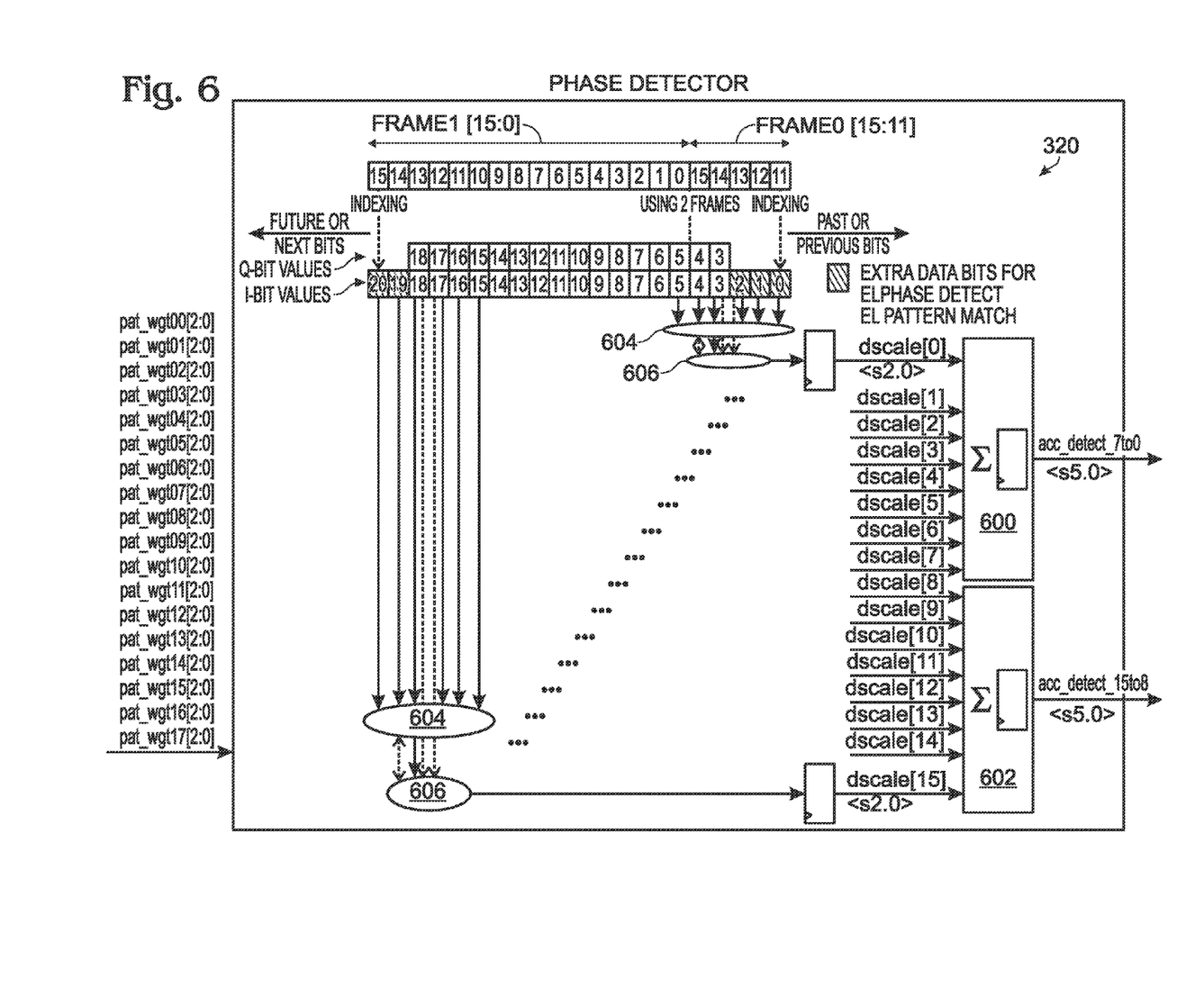
FIG. 6 is a schematic block diagram depicting a detailed example of the phase detector of FIG. 3.

FIG. 6 is a schematic block diagram depicting a detailed example of the phase detector of FIG. 3. In this example n=16, so that each digital word (frame) has 16 bits. The phase detector searches for patterns in the I-bit values and applies weights. The phase detector compares I-bit and Q-bit values to determine a phase correction (multiplier) and multiplies the weight by the multiplier. Weighted corrections for bits 0 through 7 are averaged (summed) together in summing device 600, and weighted corrections for bits 8-15 are summed in summing device 602. Pattern matching and weight assignment are associated with reference designator 604, and phase detection is associated with reference designator 606.

Figure 7:
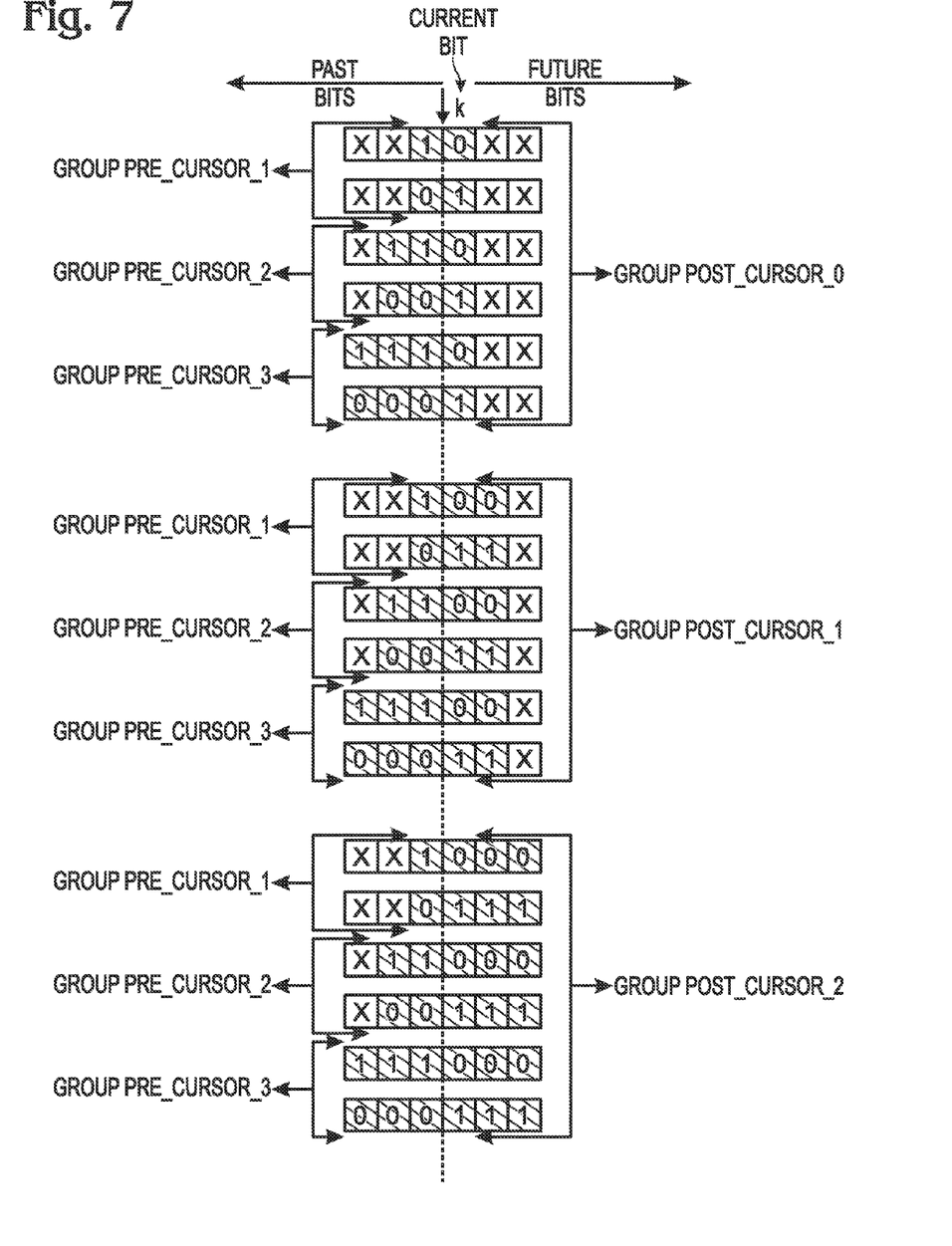
FIG. 7 is a diagram depicting an exemplary ISI pattern weighting scheme for a post-cursor channel.

FIG. 7 is a diagram depicting an exemplary ISI pattern weighting scheme for a post-cursor channel. 18 data sequence patterns are shown arranged from high ISI (low weighting) to low ISI (high weighting). Patterns in the post_cursor_0 group have a lower weighting the patterns in the post_cursor_1 group. Likewise, the patterns in the post_cursor_1 group have a lower weighting the patterns in the post_cursor_2 group. Inside each post_cursor group, the pre_cursor_1 group (with 1 past bit) has a lower weighting the pre_cursor_2 group (with 2 past bits). Likewise, the pre_cursor_2 group has a lower weighting the pre_cursor_3 group (with 3 past bits).

As shown, a maximum of 6 bits are used in a pattern match. However, patterns with a greater number of bits may also be used. Different weightings may be applied to these same patterns if the channel is identified as having a pre-cursor or symmetrical channel response characteristic.

Figure 8A:
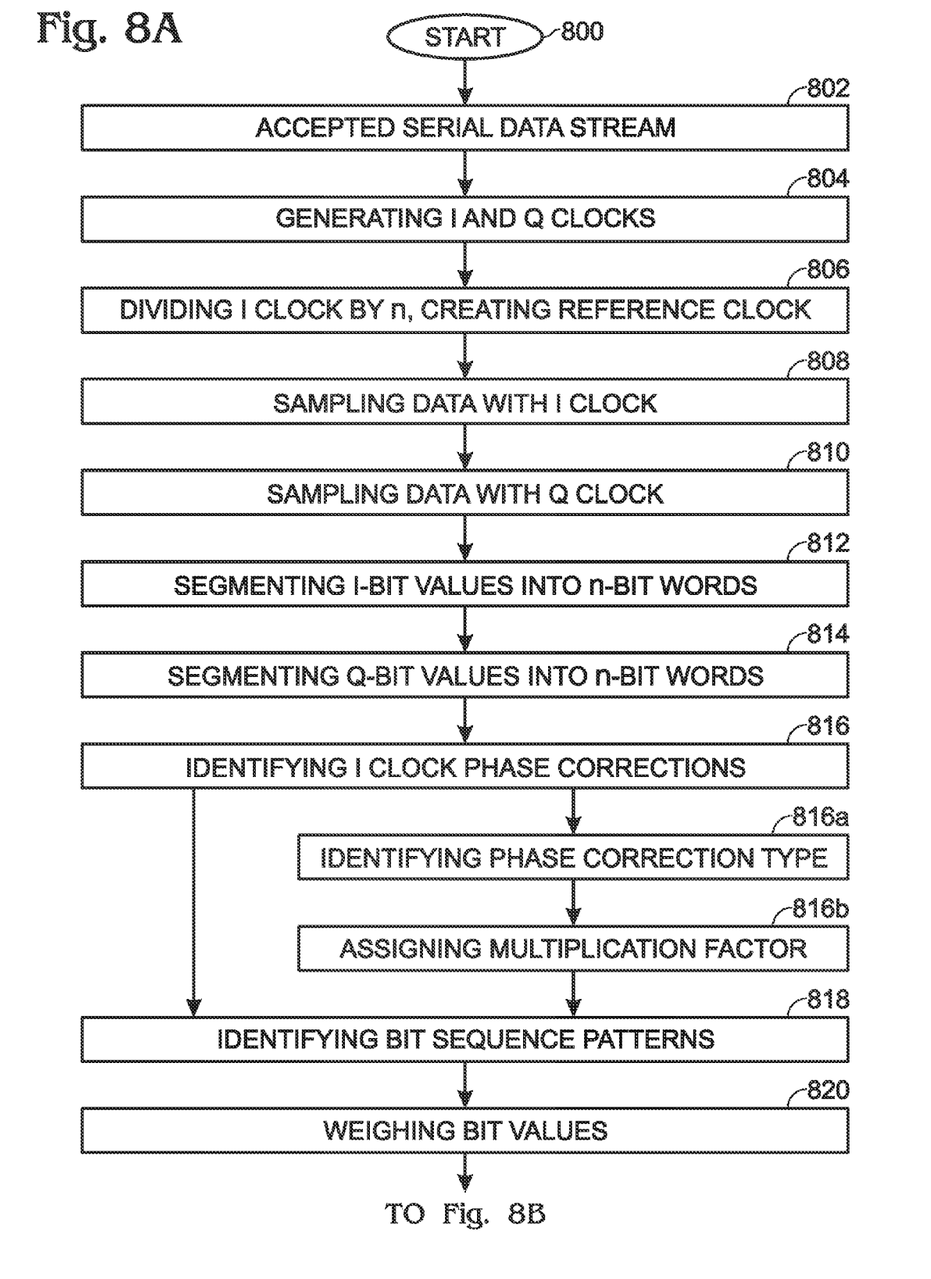
FIGS. 8A and 8B are flowcharts illustrating a method for acquisition and tracking of a recovered clock signal using an ISI pattern-weighted early-late phase detector.
Figure 8B:
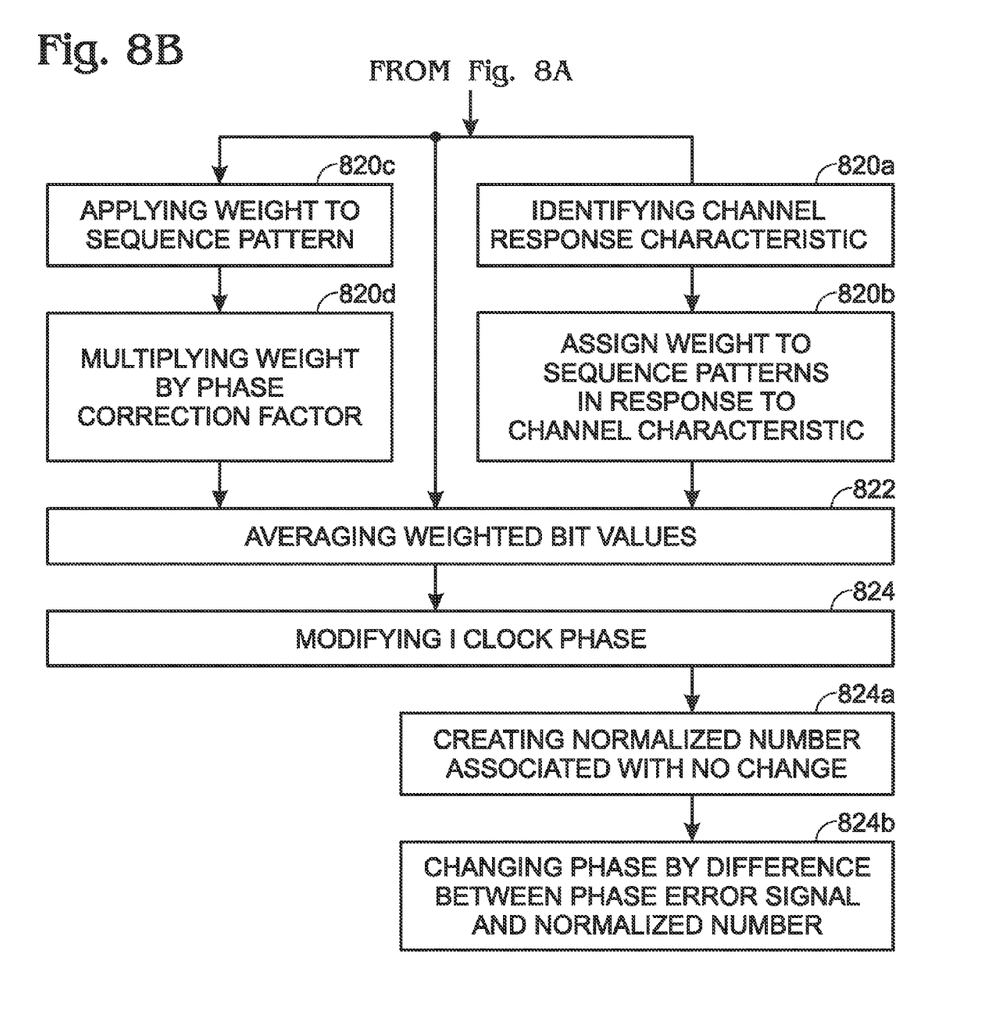

FIGS. 8A and 8B are flowcharts illustrating a method for acquisition and tracking of a recovered clock signal using an ISI pattern-weighted early-late phase detector. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 800.

Step 802 receives an electromagnetic waveform representing an analog serial data stream. Step 804 generates an I clock and Q clock having a fixed phase delay with respect to the I clock. As noted above, the I clock may be generated from a fixed-frequency clock signal. In one aspect, the Q clock is delayed 90 degrees in phase from the I clock. Step 806 divides the I clock frequency by n, creating a reference clock. Step 808 sequentially samples the serial data stream with the I clock, creating digital I-bit values. Step 810 sequentially samples the serial data stream with a Q clock, creating digital Q-bit values. Step 812 segments the I-bit values into n-bit digital words, and Step 814 segments the Q-bit values into n-bit digital words. In response to analyzing the I-bit and Q-bit values, Step 816 identifies an I clock phase correction.

Step 818 identifies bit sequence patterns associated with each I-bit value. Step 820 weights each I-bit value in response to the identified bit sequence pattern and the identified I clock phase correction. Note: Step 820 may be performed before, after, or simultaneously with Step 818. Step 822 averages the weighted I-bit values for each n-bit digital word, generating a digital phase error signal. In response to the phase error signal, Step 824 creates an electromagnetic signal representing the I clock, modified in phase. In one aspect, Step 824 includes substeps. Step 824a creates a normalized number associated with no change in the I clock phase. Step 824b changes the I clock phase by a magnitude responsive to the difference between the phase error signal and the normalized number.

In one aspect, weighting each bit value in response to the identified bit sequence pattern (Step 820) includes substeps. Step 820a identifies a response characteristic associated with a channel on which the analog serial input stream is received, where the response characteristic is a pre-cursor, post cursor, or symmetrical channel. Step 820b assigns a weight to bit sequence patterns in response to the identified channel characteristic. Note: Steps 820a and 820b may be performed at initialization or otherwise before the receipt of the serial data stream.

In another aspect, assigning weight to bit sequence patterns in Step 820 includes assigning weight in response to criteria such as the number of bits preceding a current bit value, the number of bits following the current bit value, the bit sequence length, or combinations of the above-mentioned criteria.

In one aspect, identifying the I clock phase correction in Step 816 includes substeps. Step 816a identifies an early phase, late phase, or ambiguous phase correction type. Step 816b assigns a multiplication factor to each phase correction type. The ambiguous phase has a multiplication factor of 0, the early phase has a first number multiplication factor with a first sign polarity, and the late phase has the first number multiplication factor with a second sign polarity, opposite to the first sign polarity.

Thus, weighting each I-bit value in response to the identified bit sequence pattern and the identified I clock phase correction in Step 820 may include the following substeps. Step 820c applies a weight number to identified bit sequence patterns, where a higher weight number indicates a greater degree of confidence in the identified I-bit value. Step 820d multiplies the weight number by the identified phase correction multiplication factor.

Step 816 identifies an early phase correction if:
a previous I-bit value (DI(k−1)) equals a previous Q-bit value (DQ(k−1)); and,
the previous Q-bit value (DQ(k−1)) does not equal a current I-bit value (DI(k)).

Step 816 identifies an ambiguous phase correction if:
a previous I-bit value (DI(k−1)) equals a previous Q-bit value (DQ(k−1)); and, the previous Q-bit value (DQ(k−1)) equals a current I-bit value (DI(k)).

Alternately, Step 816 identifies an ambiguous phase correction if:

the previous I-bit value (DI(k−1)) equals the current I-bit value (DQ(k)); and, the current I-bit value (DI(k)) does not equal the previous Q-bit value (DQ(k−1)).

Step 816 identifies a late phase correction if:

a previous I-bit value (DI(k−1)) does not equal a previous Q-bit value (DQ(k−1)); and, the previous Q-bit value (DQ(k−1)) equals a current I-bit value (DI(k)).

A system and method have been provided using ISI pattern weighting in the determination of signal phase corrections. Some examples of circuitry and methodology steps have been given to illustrate the invention. However, the invention is not limited to merely these examples. Likewise, the invention has been described in the context of binary numbers. However, the invention is not limited to any particular number base. Other variations and embodiments of the invention will occur to those skilled in the art.

We claim:

1. A method for acquisition and tracking of a recovered clock signal using an inter-symbol interference (ISI) pattern-weighted early-late phase detector, the method comprising:

receiving an electromagnetic waveform representing an analog serial data stream;

generating an I clock and Q clock having a fixed phase delay with respect to the I clock;

dividing the I clock frequency by n, creating a reference clock;

sequentially sampling the serial data stream with the I clock, creating digital I-bit values;

sequentially sampling the serial data stream with a Q clock, creating digital Q-bit values;

segmenting the I-bit values into n-bit digital words;

segmenting the Q-bit values into n-bit digital words;

in response to analyzing the I-bit and Q-bit values, identifying an I clock phase correction;

identifying bit sequence patterns associated with each I-bit value;

weighting each I-bit value in response to the identified bit sequence pattern and the identified I clock phase correction;

averaging the weighted I-bit values for each n-bit digital word, generating a digital phase error signal; and, in response to the phase error signal, creating an electromagnetic signal representing the I clock, modified in phase.

2. The method of claim 1 wherein generating the I and Q clocks includes generating clock that is delayed 90 degrees in phase from the I clock.

3. The method of claim 1 wherein weighting each bit value in response to the identified bit sequence pattern includes:

identifying a response characteristic associated with a channel on which the analog serial input stream is received, where the response characteristic is selected from a group consisting of pre-cursor, post cursor, and symmetrical channels; and, assigning a weight to bit sequence patterns in response to the identified channel characteristic.

4. The method of claim 3 wherein assigning weight to bit sequence patterns in response to the identified channel characteristic includes assigning weight in response to criteria selected from a group consisting of a number of bits preceding a current bit value, a number of bits following the current bit value, a bit sequence length, and combinations of the above-mentioned criteria.

5. The method of claim 1 wherein identifying the I clock phase correction includes:

identifying a phase correction type selected from a group consisting of an early phase, late phase, and ambiguous phase; and, assigning a multiplication factor to each phase correction type, where the ambiguous phase has a multiplication factor of 0, the early phase has a first number multiplication factor with a first sign polarity, and the late phase has the first number multiplication factor with a second sign polarity, opposite to the first sign polarity.

6. The method of claim 5 wherein weighting each I-bit value in response to the identified bit sequence pattern and the identified I clock phase correction includes:

applying a weight number to identified bit sequence patterns, where a higher weight number indicates a greater degree of confidence in the identified I-bit value; and, multiplying the weight number by the identified phase correction multiplication factor.

7. The method of claim 5 wherein identifying the phase correction includes identifying an early phase correction if:

a previous I-bit value (DI(k−1) equals a previous Q-bit value (DQ(k−1)); and, the previous Q-bit value (DQ(k−1)) does not equal a current I-bit value (DI(k)).

8. The method of claim 5 wherein identifying the phase correction includes identifying an ambiguous phase correction if:

a previous I-bit value (DI(k−1) equals a previous Q-bit value (DQ(k−1)); and, the previous Q-bit value (DQ(k−1)) equals a current I-bit value DI(k)); and alternately if, the previous I-bit value (DI(k−1)) equals the current I-bit value (DQ(k)); and, the current I-bit value DI(k)) does not equal the previous Q-bit value (DQ(k−1)).

9. The method of claim 5 wherein identifying the phase correction includes identifying a late phase correction if:

a previous I-bit value (DI(k−1)) does of equal a previous Q-bit value (DQ(k−1)); and, the previous Q-hit value (DQ(k−1) equals a current I-bit value (DI(k)).

10. The method of claim 1 wherein creating the I clock modified in phase includes:

creating a normalized number associated with no change in the I clock phase; and, changing the I clock phase by a magnitude responsive to the difference between the phase error signal and the normalized number.

11. A clock and data recovery (CDR) device with a system or the acquisition and tracking of a clock signal using an inter-symbol interference (ISI) pattern-weighted early-late phase detector, the system comprising:

a phase interpolator having an output to supply an I clock signal, an output to supply a Q clock signal having a fixed delay with respect to the I clock signal, and an input to accept phase error signal;

a deserializer having inputs to accept an analog serial data stream, the I clock, and the Q clock, and having an output to supply n-bit digital words of I-bit values generated by sampling the serial data stream with the I clock, n-bit words of Q-bit values generated by sampling the serial data stream with the Q clock, and a reference clock signal equal to the I clock frequency divided by n;

an early-late phase detector having an input to accept the I-bit values, Q-bit values, and reference clock, and in response to analyzing the I-bit and Q-bit values, identifying an I clock phase correction, the detector also identifying bit sequence patterns associated with each I-bit value, weighting each I-bit value in response to the identified bit sequence pattern and the identified I clock phase correction, and having an output to supply a digital average of the weighted I-bit values for each n-bit digital word;

a feedback circuit having an input to accept the average of the weighted I-bit values for each n-bit digital word and having an output to supply the phase error signal; and, wherein the phase interpolator accepts the phase error signal and modifies the phase of the I clock.

12. The system of claim 11 wherein the phase interpolator generates a Q clock signal that is delayed 90 degrees in phase from the I clock signal.

13. The system of claim 11 the deserializer accepts the analog serial data stream via a channel having a response characteristic selected from a group consisting of pre-cursor, post cursor, and symmetrical channels; and, wherein the detector assigns a weight to bit sequence patterns in response to the identified channel characteristic.

14. The system of claim 13 wherein the detector assigns weight to bit sequence patterns in response to criteria selected from a group consisting of a number of bits preceding a current bit value, a number of bits following the current bit value, a bit sequence length, and combinations of the above-mentioned criteria.

15. The system of claim 11 wherein the detector identifies a phase correction type selected from a group consisting of an early phase, late phase, and ambiguous phase, and assigns a multiplication factor to each phase correction type, where the ambiguous phase has a multiplication factor of 0, the early phase has a first number multiplication factor with a first sign polarity, and the late phase has the first number multiplication factor with a second sign polarity, opposite to the first sign polarity.

16. The system of claim 15 wherein the detector applies a weight number to identified bit sequence patterns, where a higher weight number indicates a greater degree of confidence in the identified I-bit value, and multiplies the weight number by the identified phase correction multiplication factor.

17. The system of claim 15 wherein the detector identifies an early phase correction if:
  a previous I-bit value (DI(k−1)) equals a previous Q-bit value (DQ(k−1)); and,
  the previous Q-bit value (DQ(k−1)) does not equal a current I-bit value (DI(k)).

18. The system of claim 15 wherein the detector identifies an ambiguous phase correction if:
  a previous I-bit value (DI(k−1)) equals a previous value (DQ(k−1)); and,
  the previous Q-bit value (DQ(k−1)) equals a current I-bit value (DI(k)); and alternately if,
  the previous I-bit value (DI(k−1)) equals the current I-bit value (DQ(k)); and,
  the current I-bit value (DI(k)) does not equal the previous bit value (DQ(k−1)).

19. The system of claim 15 wherein the detector identifies a late phase correction if:
  a previous I-bit value (DI(k−1)) does not equal a previous bit value (DQ(k−1)); and,
  the previous Q-bit value (DQ(k−1)) equals a current I-bit value (DI(k)).

20. The system of claim 11 wherein the phase interpolator recognizes a normalized number associated with no change in the I clock phase, and changes the I clock phase by a magnitude responsive to the difference between the phase error signal and the normalized number.

* * * * *

UNITED STATES PATENT AND TRADEMARK OFFICE
CERTIFICATE OF CORRECTION

PATENT NO. : 8,180,011 B2
APPLICATION NO. : 12/507034
DATED : May 15, 2012
INVENTOR(S) : Viet Linh Do It is certified that error appears in the above-identified patent and that said Letters Patent is hereby corrected as shown below:

In Claim 2, column 7, line 48, the phrase "a Q" should be inserted between the word "generating" and the word "clock". Claim 2 should be printed as follows:

2. The method of claim 1 wherein generating the I and Q clocks includes generating a Q clock that is delayed 90 degrees in phase from the I clock.

In Claim 9, column 8, line 37, the word "not" has been incorrectly printed as "of". Claim 9 should be printed as follows:

9. The method of claim 5 wherein identifying the phase correction includes identifying a late phase correction if: a previous I-bit value (DI(k-1)) does not equal a previous Q-bit value (DQ(k-1)); and, the previous Q-bit value (DQ(k-1)) equals a current I-bit value (DI(k)).

In Claim 11, column 8, line 49, the word "for" has been incorrectly printed as "or". Claim 11 should be printed as follows:

11. A clock and data recovery (CDR) device with a system for the acquisition and tracking of a clock signal using an inter-symbol interference (ISI) pattern-weighted early-late phase detector, the system comprising: a phase interpolator having an output to supply an I clock signal, an output to supply a Q clock signal having a fixed delay with respect to the I clock signal, and an input to accept a digital phase error signal; a deserializer having inputs to accept an analog serial data stream, the I clock, and the Q clock, and having an output to supply n-bit digital words of I-bit values generated by sampling the serial data stream with the I clock, n-bit words of Q-bit values generated by sampling the serial data stream with the Q clock, and a reference clock signal equal to the I clock frequency divided by n; an early-late phase detector having an input to accept the I-bit values, Q-bit values, and reference clock, and in response to analyzing the I-bit and Q-bit values, identifying an I clock phase correction, the detector also identifying bit sequence patterns associated with each I-bit value, weighting each I-bit value in response to the identified bit sequence pattern and the identified I clock phase correction, and having an output to supply a digital average of the weighted I-bit values for each n-bit digital Signed and Sealed this
Tenth Day of July, 2012

David J. Kappos
*Director of the United States Patent and Trademark Office* word;

a feedback circuit having an input to accept the average of the weighted I-bit values for each n-bit digital word and having an output to supply the phase error signal; and, wherein the phase interpolator accepts the phase error signal and modifies the phase of the I clock.